(12) United States Patent
Lenzi et al.

(10) Patent No.: US 6,347,559 B1
(45) Date of Patent: Feb. 19, 2002

(54) CONNECTING DEVICE

(75) Inventors: Gianluigi Lenzi; Alberico Raco, both of Bologna; Marco Savorani, Casalecchio Di Reno, all of (IT)

(73) Assignee: Magneti Marelli S.p.A., Milan (IT)

( * ) Notice: Subject to any disclaimer, the term of this patent is extended or adjusted under 35 U.S.C. 154(b) by 0 days.

(21) Appl. No.: 09/503,522

(22) Filed: Feb. 14, 2000

(30) Foreign Application Priority Data

Feb. 22, 1999 (IT) ........................ BO99 A 0074

(51) Int. Cl.[7] ............................ F16H 59/02; F16D 1/112
(52) U.S. Cl. .................... 74/473.1; 74/473.11; 403/348
(58) Field of Search ................... 74/473.1, 473.11; 403/348, 350

(56) References Cited

U.S. PATENT DOCUMENTS 4,635,327 A   1/1987  Netznik ................. 24/653
5,346,349 A  * 9/1994  Giovannetti ............ 411/549
6,167,773 B1 * 1/2001  Dorfschmid et al. ..... 74/473.11

FOREIGN PATENT DOCUMENTS

DE       3720127    7/1988
DE      19507705    9/1996

* cited by examiner

Primary Examiner—Allan D. Herrmann
(74) Attorney, Agent, or Firm—Ladas & Parry

(57) ABSTRACT

The device connects a first shaft having a respective first axis, and a second shaft having a respective second axis located a given distance from and parallel to the first axis, and has an arm integral with the first shaft, and a pocket located along the second axis of the second shaft and engaged by a distal end of the arm. The device has a body fitted to the second shaft and having a peripheral portion in which the pocket is formed, and a recess is formed close to the pocket to permit access to the pocket by the distal end.

10 Claims, 2 Drawing Sheets

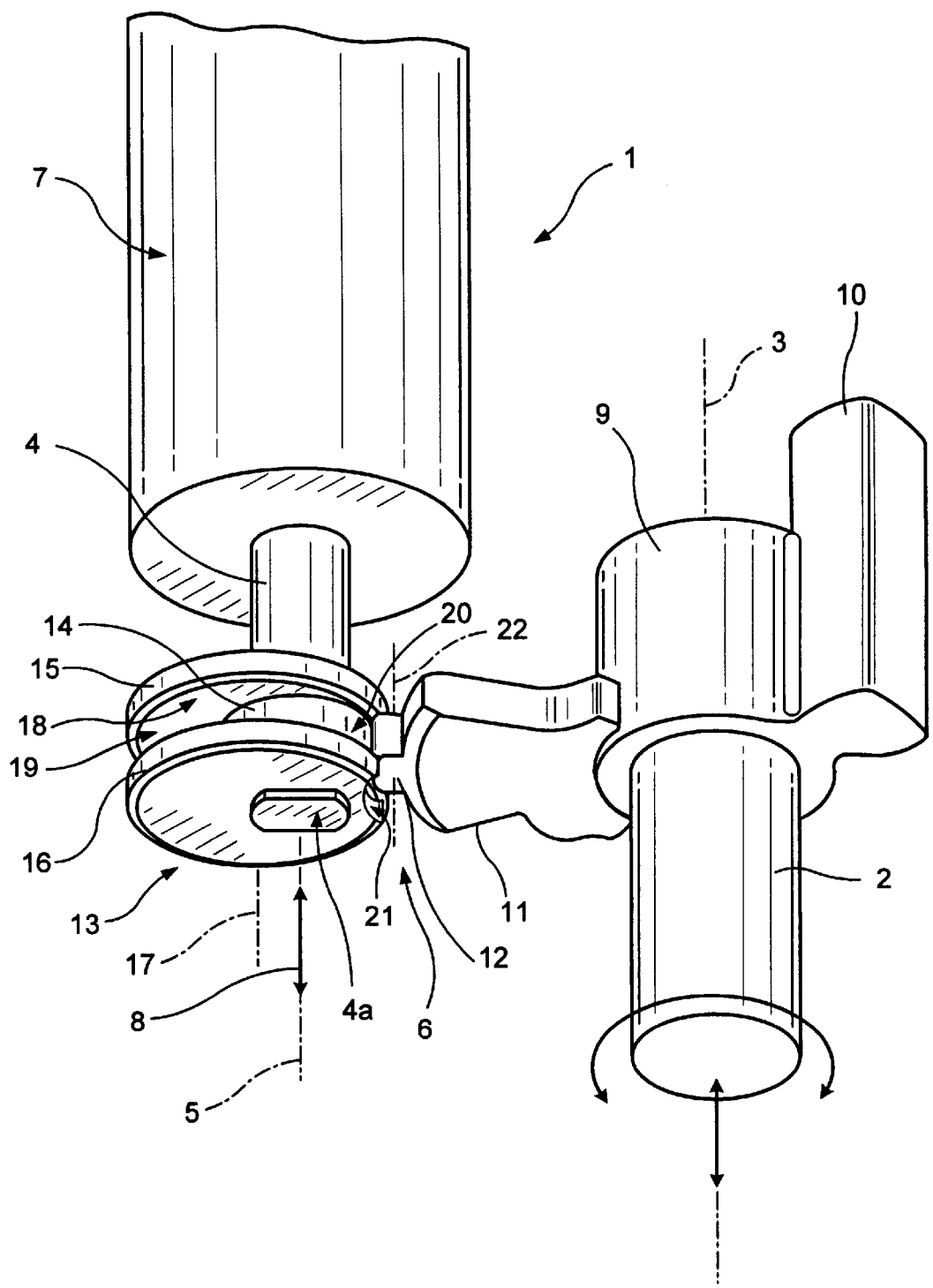
F I G. 1

CONNECTING DEVICE

The present invention relates to a connecting device.

More specifically, the present invention relates to a device for connecting noncoaxial shafts of a mechanical assisted vehicle transmission, to which the present invention refers purely by way of example.

BACKGROUND OF THE INVENTION

Mechanical assisted vehicle transmissions generally comprise a shift rod, a control shaft, a connecting device connecting the shift rod and control shaft, and an actuating device for rotating the shift rod.

The shift rod has a longitudinal axis, and, in use, rotates a few degrees about its axis with respect to a neutral position, and is movable in a direction parallel to its axis; the control shaft has an axis parallel to the axis of the shift rod, and is connected to a linear actuator for translating the control shaft along its axis; the connecting device comprises a lever integral with the shift rod, extending crosswise to said axes, and comprising an appendix which, in use, engages a groove formed in the control shaft; and the connecting device transmits axial displacements from the control shaft to the shift rod to enable the shift rod to rotate as stated about its own axis. Though effective in terms of transmission performance, a major drawback of such connecting devices lies in insertion of the appendix inside the groove seriously slowing down assembly of the transmission.

SUMMARY OF THE INVENTION

It is an object of the present invention to provide a connecting device designed to eliminate the aforementioned drawbacks.

According to the present invention, there is provided a connecting device for connecting a first shaft having a respective first axis, and a second shaft having a respective second axis located a given distance from the first axis and parallel to said first axis; said connecting device comprising an arm integral with said first shaft, and a pocket located along said second axis of said second shaft; said pocket being engaged by a distal end of said arm; and said connecting device being characterized by comprising a body fitted to said second shaft, said body having said pocket formed on a peripheral portion of said body, and a recess permitting access by said distal end to said pocket.

BRIEF DESCRIPTION OF THE DRAWINGS

A non-limiting embodiment of the present invention will be described by way of example with reference to the accompanying drawings, in which:

FIG. 1 shows a partial view in perspective of a vehicle transmission;

DETAILED DESCRIPTION OF THE INVENTION

Figure 2:
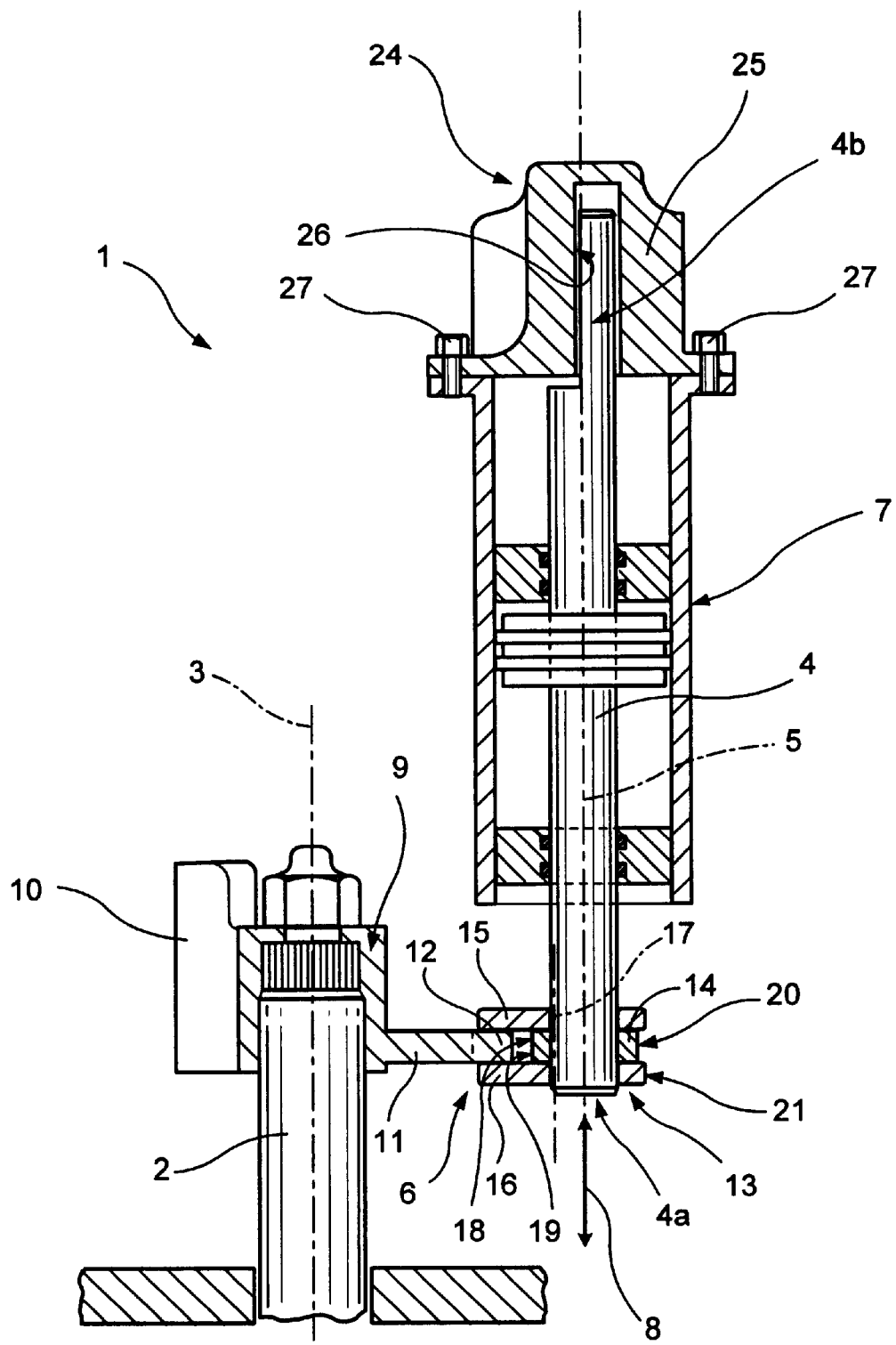
FIG. 2 shows a section, with parts removed for clarity, of a detail of the FIG. 1 transmission.

Number 1 in FIGS. 1 and 2 indicates as a whole an assisted transmission for a known vehicle not shown.

Transmission 1 comprises a gear shift rod 2 movable axially and which rotates angularly about a respective axis 3; and a control shaft 4 having a respective axis 5 parallel to axis 3. Axis 5 is located a given distance from axis 3, and transmission 1 also comprises a connecting device 6 between rod 2 and shaft 4; a three-position linear actuator 7 connected to shaft 4 to move shaft 4 in a direction 8 parallel to axes 3 and 5; and a hub 9 connected to one end of rod 2.

Hub 9 comprises an arm 10 projecting radially with respect to axis 3 and acted on by a known actuator (not shown) to transmit torque to rod 2 and rotate rod 2 by a few degrees about a neutral position.

Hub 9 also comprises an arm 11, which forms part of device 6, extends radially with respect to axis 3, is in the form of a plate perpendicular to axis 3, and has an appendix 12 on the distal end.

In addition to arm 11, connecting device 6 also comprises a hub 13 fitted to shaft 4, which in turn is movable angularly between a connection position shown in FIG. 2, and an engagement position shown in FIG. 1.

Hub 13 comprises a central disk 14 coaxial with axis 5 of shaft 4; and two eccentric disks 15 and 16, which are parallel to and face each other, are located on opposite sides of central disk 14, and are substantially perpendicular to axis 5. Disks 15 and 16 are larger in diameter than disk 14, have a common axis 17 parallel to but not aligned with axis 5, and are therefore eccentric with respect to disk 14.

An annular groove 18 of varying radial depth is thus formed between disks 15 and 16, and which has a portion 19 of maximum radial depth, and a portion 20 of minimum radial depth.

Eccentric disk 16 is located at the distal end of shaft 4, and comprises a recess 21 along its outer periphery, at the minimum-depth portion 20 of groove 18. Recess 21 is rounded, is so sized as to permit insertion of appendix 12 inside annular groove 18 in direction 8, and has a respective axis 22 parallel to direction 8.

With reference to FIG. 2, shaft 4 comprises a central portion housed inside actuator 7; a first end portion 4a outside actuator 7 and supporting hub 13; and a second end portion 4b extending outside actuator 7, at the opposite end to portion 4a.

Transmission 1 also comprises means 24 for locking the angular position of shaft 4 about axis 5, and which are installed after connecting hub 13 and arm 11 as described below.

In the example shown, means 24 comprise the end portion 4b of shaft 4, on which a flat face is formed, and a cup-shaped body 25 having a seat 26 for housing end portion 4b; seat 26 being of such a depth as to permit axial translation of portion 4b and, hence, travel of shaft 4 in direction 8. Cup-shaped body 25 is fitted by screws 27 to the casing of actuator 7, and seat 26 has a flat face facing the flat face of end portion 4b.

In actual use, connection of hub 13 and arm 11 commences as of a position in which shaft 4 is withdrawn inside linear actuator 7, so that hub 13 is positioned above arm 11, and arm 11 is oriented so as to position appendix 12 at the minimum distance from shaft 4.

With shaft 4 in the engage position, i.e. with recess 21 at the minimum distance from rod 2, the whole comprising shaft 4 and hub 13 is lowered axially to position hub 13 facing hub 9, with appendix 12 of arm 11 of hub 9 inside portion 20 of annular groove 18 of hub 13 and substantially contacting disk 15 (FIG. 1). Appendix 12 is obviously inserted inside groove 18 through recess 21.

Once appendix 12 is inserted inside portion 20 of annular groove 18, hub 13 is rotated 180 degrees about axis 5 to trap appendix 12 between disks 15 and 16 and inside the maximum-radial-depth portion 19 of annular groove 18, as shown in FIG. 2. Hub 13 is rotated 180 degrees by rotating shaft 4 180 degrees about axis 5 into the above connection position.

At this point, cup-shaped body 25 is fixed to the casing of linear actuator 7 so as to house end portion 4b inside seat 26, with the flat faces of portion 4b and seat 26 facing each other; which flat faces cooperate to prevent any further rotation of shaft 4 about axis 5.

Once connection is completed, linear actuator 7, by moving shaft 4 in, direction 8. provides for axially moving rod 2, while connecting device 6 leaves rod 2 free to be rotated about axis 3 by the actuator (not shown) acting on arm 10. Needless to say, the position of appendix 12 inside annular groove 18 depends on the various angular positions into which rod 2 is moved by the actuator acting on arm 10.

Clearly, changes may be made to connecting device 6 and transmission 1 as described and illustrated herein without, however, departing from the scope of the present invention.

What is claimed is:

1. A connecting device for connecting a first shaft (2) having a respective first axis (3), and a second shaft (4) having a respective second axis (5) located at a given distance from the first axis (3) and parallel to said first axis (3); said connecting device (6) comprising an arm (11) integral with said first shaft (2), and a pocket (18) located along said second axis (5) of said second shaft (4); said pocket (18) being engageable by a distal end (12) of said arm (11); a hub (13) fitted on said second shaft (4), said hub (13) having an outer periphery and an annular groove (18) a t said outer periphery of the hub defining said pocket (18) and a recess (21) permitting access by said distal end (12) to said annular groove (18) such that with the distal end (12) not engaged in said groove, said first shaft is free to rotate about said first axis while said second shaft is stationary.

2. A device as claimed in claim 1, wherein said annular groove (18) has a first portion (19) of maximum radial depth and a second portion (20) of minimum radial depth; said recess (21) being located along the outer periphery of said hub (13), at said second portion of minimum radial depth (20) of said annular groove (18).

3. A device as claimed in claim 2, wherein said hub (13) comprises a central portion (14) and two end portions (15, 16) located on opposite sides of said central portion 914) along said second axis (5); said central portion (14) and said two end portions (15, 16) defining said annular groove (18).

4. A device as claimed in claim 3, wherein said central portion (14) and said end portions (15, 16) of said hub (13) are disks (14, 15, 16); said end portions (15, 16) being larger in diameter than said central portion (14).

5. A device as claimed in claim 4, wherein the central portion (14) of said hub (13) is coaxial with said second shaft (4), and the end portions (15, 16) of said hub (13) are coaxial with each other and offset with respect to said central portion (14).

6. A device as claimed in claim 5, wherein said recess (21) permitting access to said groove is formed along an axis (22) parallel to said second axis (5), in at least one of said end portions (15, 16) of the hub (13), close to the second portion (20) of said annular groove (18).

7. A device as claimed in claim 6, wherein said hub (13) is fitted to a distal end of said second shaft (4); said recess (21) being formed in said end portion (16) closest to said distal end of said second shaft (4).

8. A vehicle transmission comprising the connecting device (6) as claimed in claim 1, said first shaft (2) being a shift rod (2).

9. A transmission as claimed in claim 8, comprising means (24) for locking rotation of said second shaft (4) about said second axis (5).

10. A transmission as claimed in claim 9, wherein said means (24) comprises a cup-shaped body (25) secured angularly and having a seat (26) for receiving an end portion (4b) of said second shaft (4).

\* \* \* \* \*